United States Patent [19]
Carnell

[11] Patent Number: 5,952,595
[45] Date of Patent: Sep. 14, 1999

[54] CHORD HAND FINGER CONDITIONER FOR GUITAR PLAYERS

[76] Inventor: Richard D. Carnell, 33 Briar La., Essex Junction, Vt. 05452

[21] Appl. No.: 09/076,478

[22] Filed: May 12, 1998

[51] Int. Cl.[6] .................................................. G09B 15/06
[52] U.S. Cl. ............................................................ 84/465
[58] Field of Search ................................ 84/465, 314 R, 84/314 N, 315, 470, 453, 267

[56] References Cited

U.S. PATENT DOCUMENTS

| | | | |
|---|---|---|---|
| 1,636,133 | 7/1927 | Horton | 84/267 |
| 3,756,223 | 9/1973 | Carbone | 126/26 |
| 4,065,995 | 1/1978 | Greer | 84/465 |
| 4,505,178 | 3/1985 | Redman | 84/465 |
| 5,696,337 | 12/1997 | Hall | 84/314 R |
| 5,756,914 | 5/1998 | Streibl | 84/465 |

FOREIGN PATENT DOCUMENTS 2829170  1/1980  Germany.

*Primary Examiner*—William M. Shoop, Jr.
*Assistant Examiner*—Wesley Scott Ashton

[57] ABSTRACT

A exercising and conditioning device is used in the chord hand of people who play a guitar or similar stringed instruments. The device has a body with an upper surface containing a longitudinal groove. At least one string is tensioned within the groove below the upper surface so that, when the body is held in a hand, all the tips of fingers of that hand may extend into the groove to depress the string. Depressing the string builds callus pads on the ends of the fingers and strengthens muscles used to depress the strings. Placing the string within the groove assists in guiding the fingers to the best position on the string.

5 Claims, 1 Drawing Sheet

CHORD HAND FINGER CONDITIONER FOR GUITAR PLAYERS

SUMMARY

The present invention is directed to an exerciser and finger callus conditioner for the chord hand of the player of a guitar or like instrument. The exerciser and finger callus conditioner having features of the present invention comprises an elongated body having an upper surface containing a deep longitudinal groove. The upper surface curves outward and downward laterally from the groove. The body has a lower surface curved laterally to rest in the palm of the hand of a user. The longitudinal groove is of a length to receive all the finger tips of a hand when the body is held in the hand of a user and fingers are curled around the body. At least one string is fixed to extend longitudinally within the groove below the upper surface of the body. The string may be looped to form two closely spaced runs. The string or the runs are tensioned by string tensioning means so that finger tips may force the string down within the groove to condition finger tip calluses and exercise and strengthen fingers.

A great advantage of this invention is its ease of portability so that a musician can keep his chord hand in top condition even when not playing frequently. Another advantage is that the runs of string are positioned down inside the groove which guides the fingers onto the strings in a correct position from which the strings can then be pressed down deeper into the groove. The force of the taunt strings on the tips of a user's fingers will build or maintain calluses in the same manner as naturally happens when playing a stringed instrument such as a guitar or the like. Because the finger exerciser and callus builder has a symmetrical body, it can be used by both right and left handed people. The V-groove trains the fingers to come straight down on the strings with the finger tips to promote good fingering style.

DESCRIPTION OF THE INVENTION

Figure 1:
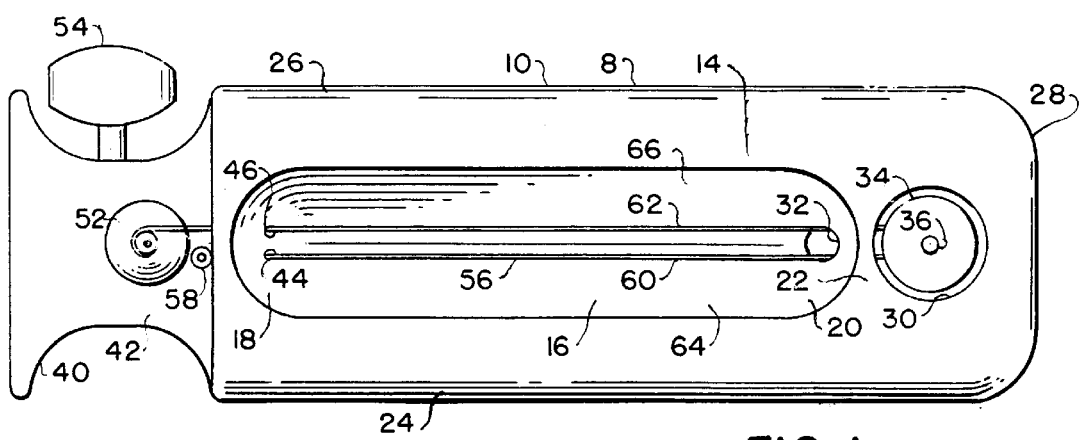
FIG. 1 is a top view of the chord hand conditioner of my invention.

Referring to the drawings in detail, the chord hand finger conditioner 8, shown in FIG. 1, has a body 10. As may be seen in FIG. 3, body 10 has a rounded lower surface 12 to fit in the palm of the chord hand of a user. The upper surface 14 of body 10 contains a longitudinal groove 16 of sufficient length to receive all the finger tips of the hand (not shown) of a user as the fingers curl about the body 10. As shown, conical surfaces 18 and 20 form the ends of groove 16. Upper surface 14 has a flat central portion 22 with outwardly and downwardly curving edges 24 and 26.

Figure 2:
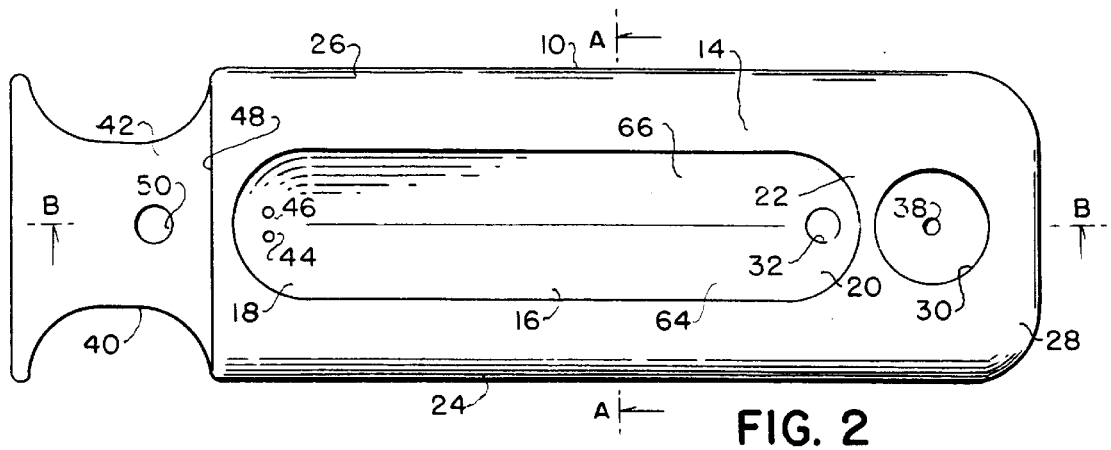
FIG. 2 is a top view of the body of the chord hand conditioner.
Figures 3, 4:
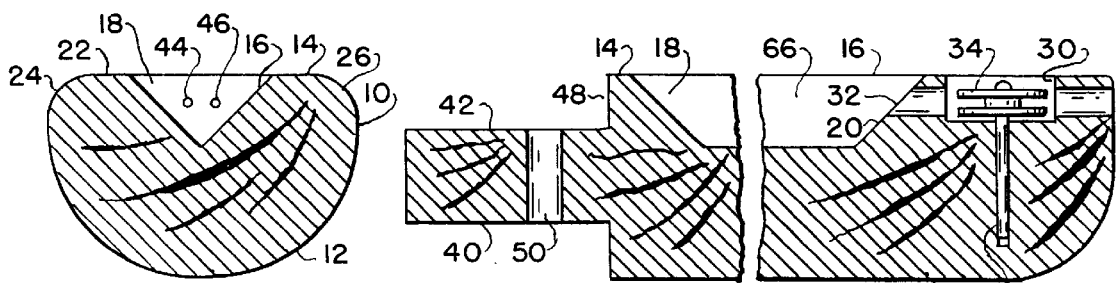
FIG. 3 is a transverse section taken on line A—A of FIG. 1.
FIG. 4 is a longitudinal section taken on line B—B of FIG. 1 with a central portion broken away.

As is further shown in FIGS. 2 and 4, a first end 28 of body 10 contains a vertical opening 30. It also contains a longitudinal aperture 32 which extends at least from surface 20 of groove 16 to opening 30. A pulley 34 may be rotatably mounted on a shaft 36 mounted in a small vertical hole 38 centered at the bottom of vertical opening 30. Any element equivalent to pulley 34 may be used such as a suitable glass bead (not shown) or the like.

A second end 40 of body 10 extends therefrom to have a top surface 42 lower than the upper surface 14 of body 10. A pair of small side by side apertures 44 and 46 extend from the conical surface 18 to the vertical surface 48. In an aperture 50 a tuning head 52 is mounted with its key 54.

A string 56 has an enlarged end nob 58 which is held by aperture 44 as string 56 extends through it. String 56 then extends longitudinally through groove 16 to enter aperture 32, extend around pulley 34, re-enter aperture 32, pass again through groove 16 to extend through aperture 46 and be tensioned by key 54 of tuning head 52. Thus two parallel runs 60 and 62 of string 56 are simultaneously tensioned by turning key 54. Groove 16 is preferably V-shaped with flat sides 64 and 66.

I claim:

1. A chord hand exerciser and finger callus conditioner for guitar players comprising, in combination, an elongated body having a lower surface curved laterally to rest on the palm of a hand of a user, said elongated body having an upper surface containing a deep longitudinal groove, said upper surface extending outward and curving laterally downward, said longitudinal groove being of a length to receive the all the finger tips of a hand when said body is held in the hand of a user, at least one string fixed to extend longitudinally within said groove below said flat portion of said upper surface, and string tensioning means tensioning said at least one string within said groove so that finger tips may force said at least one string down within said groove.

2. The combination according to claim 1 wherein said groove is V-shaped.

3. A chord hand exerciser and finger callus conditioner for guitar players comprising, in combination, an elongated body having a lower surface curved laterally to rest on the palm of a hand of a user, said elongated body having an upper surface containing a deep longitudinal groove, said upper surface extending outward and curving laterally downward, said longitudinal groove being of a length to receive all the finger tips of a hand, a first end of said body extending beyond said groove and containing a vertical opening in said upper surface, said body containing a longitudinal aperture extending from said groove to said vertical opening, pulley means in said opening, a second end of said body extending beyond said groove, string tensioning means at said second end, and a string fixed at said second end extending longitudinally within said groove, through said longitudinal aperture, around said pulley means, back through said longitudinal aperture, and within said groove to said string tensioning means, said string forming parallel runs within said groove below said flat portion of said upper surface so that finger tips may force said parallel runs down within said groove.

4. The combination according to claim 3 wherein said groove is V-shaped.

5. A chord hand exerciser and finger callus conditioner for guitar players comprising, in combination, an elongated body having a lower surface curved laterally to rest on the palm of a hand of a user, said elongated body having an upper surface containing a deep longitudinal V-shaped groove, said upper surface extending outward and curving laterally downward, said longitudinal groove being of a length to simultaneously receive the all the finger tips of a hand, a first end of said body extending beyond said groove and containing a vertical opening in said upper surface, said body containing a longitudinal aperture extending from said groove to said vertical opening, a pulley within said vertical opening, a second end of said body extending beyond said groove, said second end having a top surface below said upper surface of said body, said body containing first and second side by side apertures extending from said groove to terminate above said top surface, a tuning head mounted through said second end, and a string having an end enlargement, said string extending through said first of said side by side apertures and being secured by said end enlargement, said string continuing through said groove, said longitudinal aperture, around said pulley, back through said longitudinal aperture, back through said groove to said second of said side by side apertures to said tuning head, said string forming tensioned parallel runs within said groove below said upper surface so that finger tips may force said runs down within said groove.

* * * * *